United States Patent
Nakamura

(10) Patent No.: US 11,202,048 B2
(45) Date of Patent: Dec. 14, 2021

(54) VIDEO PROCESSING DEVICE, VIDEO PROCESSING SYSTEM, VIDEO PROCESSING METHOD, AND VIDEO OUTPUT DEVICE

(71) Applicant: Panasonic Intellectual Property Management Co., Ltd., Osaka (JP)

(72) Inventor: Takayuki Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 360 days.

(21) Appl. No.: 16/086,026

(22) PCT Filed: Feb. 21, 2017

(86) PCT No.: PCT/JP2017/006274
§ 371 (c)(1),
(2) Date: Sep. 18, 2018

(87) PCT Pub. No.: WO2017/169293
PCT Pub. Date: Oct. 5, 2017

(65) Prior Publication Data
US 2020/0296345 A1 Sep. 17, 2020

(30) Foreign Application Priority Data
Mar. 28, 2016 (JP) .............................. JP2016-062992

(51) Int. Cl.
*H04N 9/82* (2006.01)
*H04N 9/804* (2006.01)

(52) U.S. Cl.
CPC ......... *H04N 9/8227* (2013.01); *H04N 9/8042* (2013.01)

(58) Field of Classification Search
CPC ........................... H04N 9/8227; H04N 9/8042
See application file for complete search history.

(56) References Cited

U.S. PATENT DOCUMENTS

2010/0220978 A1* 9/2010 Ogikubo .............. G11B 27/034
715/716
2011/0032387 A1 2/2011 Takahashi
(Continued)

FOREIGN PATENT DOCUMENTS

JP    11-238359    8/1999
JP    2003-244587  8/2003
(Continued)

OTHER PUBLICATIONS

International Search Report dated May 30, 2017 in International (PCT) Application No. PCT/JP2017/006274.

*Primary Examiner* — Mishawn N. Hunter
(74) *Attorney, Agent, or Firm* — Wenderoth, Lind & Ponack, L.L.P.

(57) ABSTRACT

A video processing device connectable with a recorder includes a first receiver and a controller. The first receiver receives a main video signal containing two or more frames which are consecutive in time sequence, the main video signal produced by imaging two or more subjects including at least one moving subject. The controller generates one or more sub video signals produced by imaging a first subject of the plurality of subjects, from the main video signal. The controller generates main video data including the main video signal and first association information specifying the one or more sub video signals generated from the main video signal. Furthermore, the controller generates one or more sub video data including the one or more sub video signals and second association information specifying the main video signal from which the one or more sub video signals have been generated. The controller makes a recorder store the main video data and the one or more sub video data.

11 Claims, 18 Drawing Sheets

(56) References Cited

U.S. PATENT DOCUMENTS

2013/0229563 A1* 9/2013 Ogino .................... H04N 5/265
                                                        348/333.12
2018/0205779 A1* 7/2018 Pan ........................ H04L 29/06

FOREIGN PATENT DOCUMENTS

| JP | 2009-290860 | 12/2009 |
| JP | 2013-175819 | 9/2013 |
| JP | 2014-036339 | 2/2014 |

* cited by examiner

| Universal label | Length | Instance number | Material number |
|---|---|---|---|
| | | 0x000000 | 0x0123456789ABCDEF0123456789ABCDEF |

| Universal label | Length | Instance number | Material number |
|---|---|---|---|
| | | 0x000001 | 0x0123456789ABCDEF0123456789ABCDEF |

| Universal label | Length | Instance number | Material number |
|---|---|---|---|
| | | 0x 000101 | 0x0123456789ABCDEF0123456789ABCDEF |

| Universal label | Length | Instance number | Material number |
|---|---|---|---|
| | | 0x 000201 | 0x0123456789ABCDEF0123456789ABCDEF |

VIDEO PROCESSING DEVICE, VIDEO PROCESSING SYSTEM, VIDEO PROCESSING METHOD, AND VIDEO OUTPUT DEVICE

TECHNICAL FIELD

The present disclosure relates to a video processing device, video processing system, video processing method, and video output device.

BACKGROUND

Patent literature 1 discloses a video recording and reproducing device that records sub image data correlated with main image data while reproducing the main image data. The video recording and reproducing device reproduces sub image data correlated to the main image data linked with reproducing the main image data.

CITATION LIST

Patent Literature

PTL 1: Japanese Patent Unexamined Publication No. H11-238359

SUMMARY

A video processing device of the present disclosure is connectable with a recorder and includes a first receiver and a controller. The first receiver receives a main video signal that contains two or more frames which are consecutive in time sequence and has been created by capturing two or more subjects including at least one moving subject. The controller generates one or more sub video signals that have been created by capturing a first subject of two or more subjects, from the main video signal. The controller generates main video data that includes the main video signal and a first association information specifying one or more sub video signals generated from the main video signal. The controller further generates one or more sub video data that includes one or more sub video signals and a second association information specifying the main video signal from which the one or more sub video signals have been generated. The controller makes the recorder store the main video data and the one or more sub video data.

A video processing device, video processing system, video processing method, and video output device according to the present disclosure effectively generate a wide variety of images with simple operation.

BRIEF DESCRIPTION OF DRAWINGS

FIG. 3A illustrates an example of a UMID that associates a main video signal with its sub video signal.

FIG. 3B illustrates an example of a UMID that associates a main video signal with its sub video signal.

FIG. 3C illustrates an example of a UMID that associates a main video signal with its sub video signal.

FIG. 3D illustrates an example of a UMID that associates a main video signal with its sub video signal.

DESCRIPTION OF EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure and it is not intended that the drawings and the description limit the subjects described in the claims.

First Exemplary Embodiment

Hereinafter, a description is made of a video recording system according to the first embodiment.

1-1 Configuration
1-1-1 Video Recording System

Figure 1:
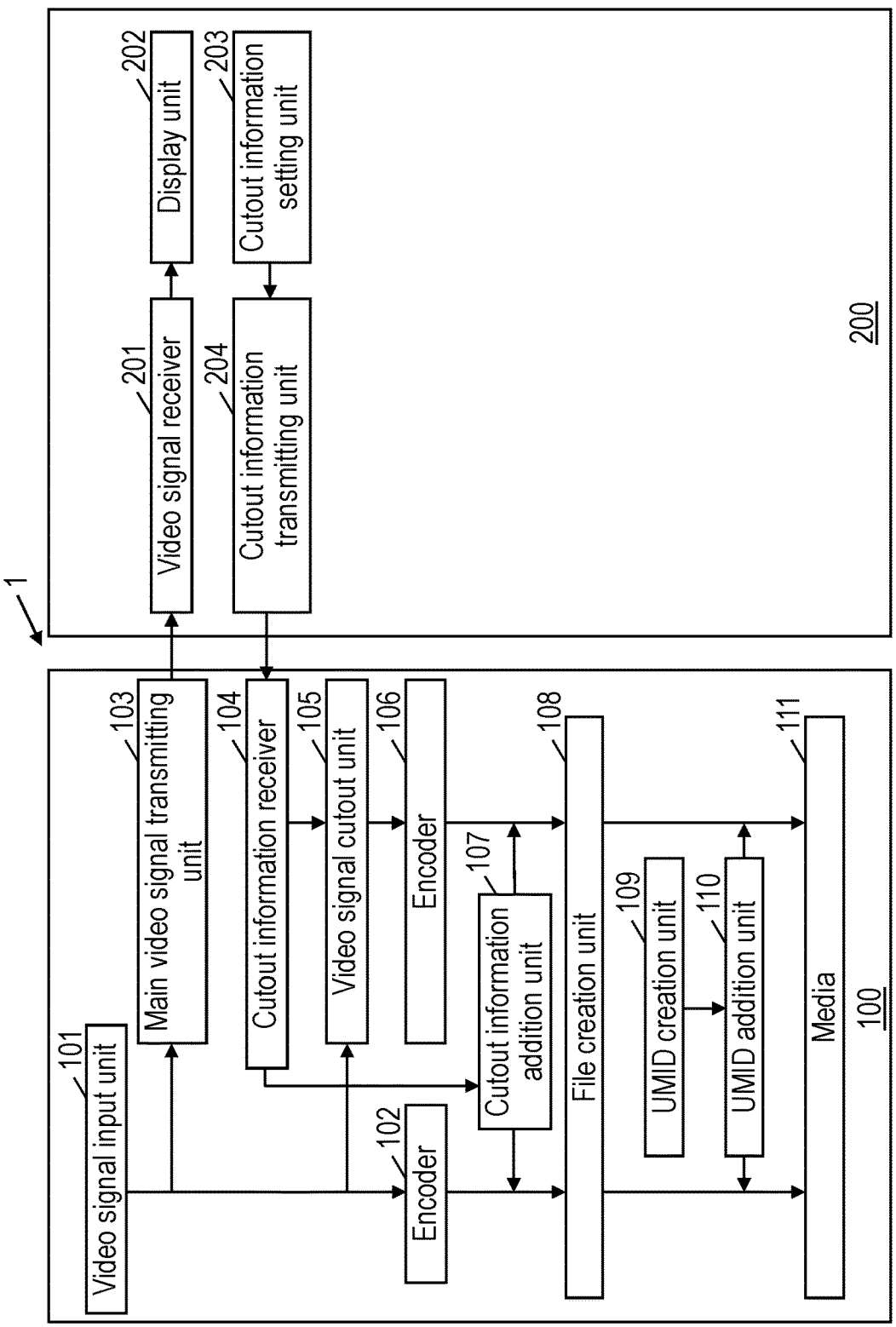
FIG. 1 is a block diagram of a video recording system according to the first exemplary embodiment.

FIG. 1 is a functional block diagram of video recording system 1 of the present disclosure. Video recording system 1 includes video recording device 100 and display device 200 connectable to video recording device 100. Video recording device 100 is a video camera for example. Display device 200 is a computer terminal equipped with a display unit such as a liquid crystal display and an organic electroluminescence display. Video recording device 100 and display device 200 may be connected with each other either wiredly or wirelessly.

Video recording system 1 acquires a video signal that contains two or more frames which are consecutive in time sequence and has been created by capturing two or more subjects including at least one moving subject, and cuts out part of the video signal containing a specific subject to generate another video signal. Hereinafter, a video signal cut out is referred to as a sub video signal, and an original video signal from which the sub video signal is cut out is referred to as a main video signal. Video recording system 1 generates a main video signal and its sub video signal associated with each other and stores them.

1-1-2 Video Recording Device

Video recording device 100 includes video signal input unit 101, encoder 102, main video signal transmitting unit 103, cutout information receiver 104, video signal cutout unit 105, encoder 106, cutout information addition unit 107, file creation unit 108, UMID creation unit 109, UMID addition unit 110, and media 111.

Video signal input unit 101 receives a video signal captured by an imaging device such as a camera. Encoder 102 encodes the video signal (hereinafter, referred to as a main video signal) output from video signal input unit 101. Main video signal transmitting unit 103 transmits the main video signal input from video signal input unit 101 to display device 200. Cutout information receiver 104 receives cutout information created by display device 200. Video signal cutout unit 105 creates a sub video signal based on the cutout information received by cutout information receiver 104. Encoder 106 encodes the video signal (hereinafter, referred to as a sub video signal) output from video signal cutout unit 105. Note that, hereinafter, "encoding" can mean encoding either with compression or without compression. Cutout information addition unit 107 multiplexes the cutout information received by cutout information receiver 104 with main video data encoded by encoder 102 and with sub video data encoded by encoder 106. File creation unit 108 creates a main video file from the main video data to which the cutout information has been added by cutout information addition unit 107, and creates a sub video file from the sub video data to which the cutout information has been added. UMID creation unit 109 creates a UMID (unique material identifier) for the main video file created by file creation unit 108, and creates a UMID for the sub video file created by file creation unit 108. UMID addition unit 110 adds the UMID for a main video signal created by UMID creation unit 109 to the main video file, and adds the UMID for a sub video signal to the sub video file. Media 111 records the main video file and the sub video file to which the respective UMIDs have been added.

1-1-3 Display Device

Display device 200 includes video signal receiver 201, display unit 202, cutout information setting unit 203, and cutout information transmitting unit 204.

Video signal receiver 201 receives a main video signal transmitted from main video signal transmitting unit 103 of video recording device 100. Display unit 202 displays the main video signal received by video signal receiver 201. Cutout information setting unit 203 sets a range of the main video signal to be cut out. Cutout information transmitting unit 204 transmits the cutout information set by cutout information setting unit 203 to video recording device 100.

1-1-4 Data Format

Figure 2:
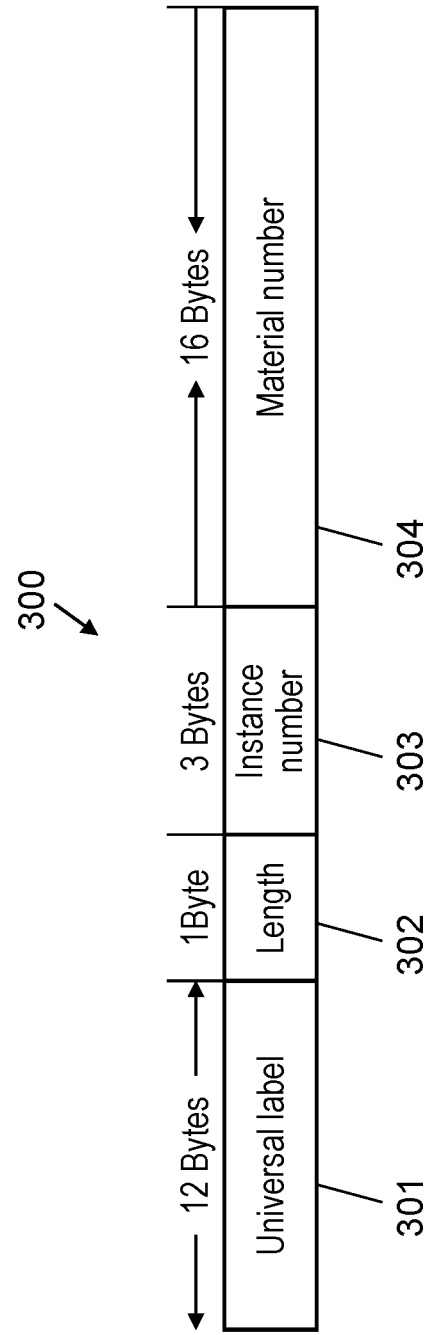
FIG. 2 illustrates the data configuration of a UMID (unique material identifier).

FIG. 2 illustrates the data format of a UMID defined in SMPTE 330M. UMID 300 is an identifier that uniquely identifies a video signal. UMID 300 includes universal label 301, length 302, instance number 303, and information on material number 304. Universal label 301 is a fixed byte series determined in SMPTE 330M. Length 302 is the length from instance number 303 to the end. Instance number 303 indicates the origin of the material, and material number 304 contains a device-specific byte series created from the ID of the device and time information.

FIGS. 3A through 3D illustrate concrete examples of the data format shown in FIG. 2. FIG. 3A shows the configuration of UMID 400 generated for a video file without its sub video signal. FIG. 3B shows the configuration of UMID 401 generated for a video file with its sub video signal. FIG. 3C shows the configuration of UMID 402 generated for a first sub video file. FIG. 3D, if a second sub video signal is present, shows the configuration of UMID 403 generated for the second sub video signal.

Figure 4A:
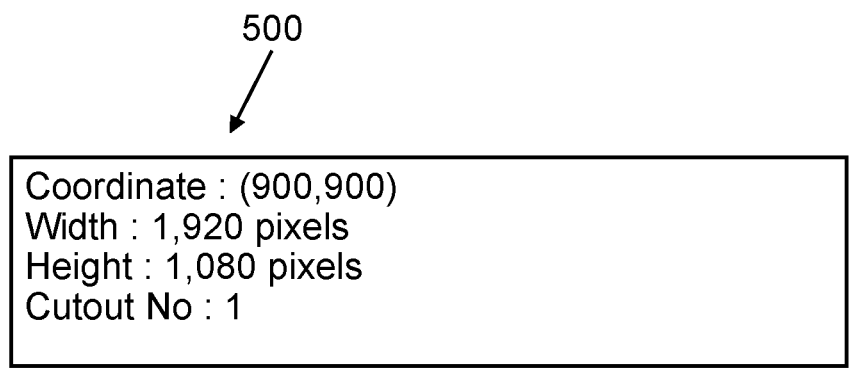
FIG. 4A illustrates an example of cutout information.
Figure 4B:
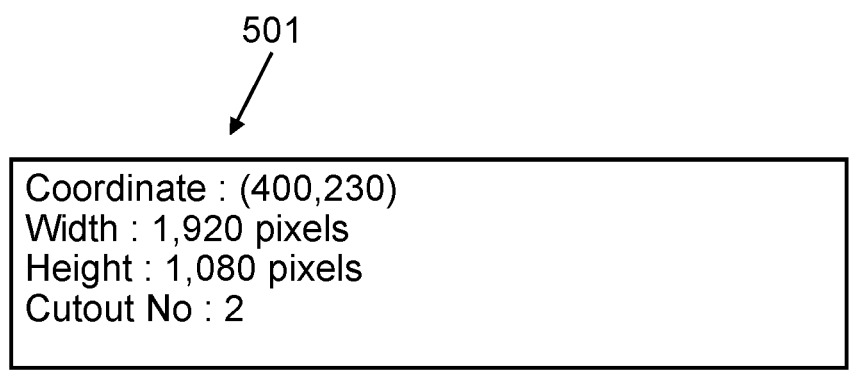
FIG. 4B illustrates an example of cutout information.

FIG. 4A illustrates a concrete example of one cutout information 500. FIG. 4B illustrates a concrete example of another cutout information 500. Cutout information 500 and 501 represent information specifying the position of a specific subject selected in the main video signal.

Figure 5:
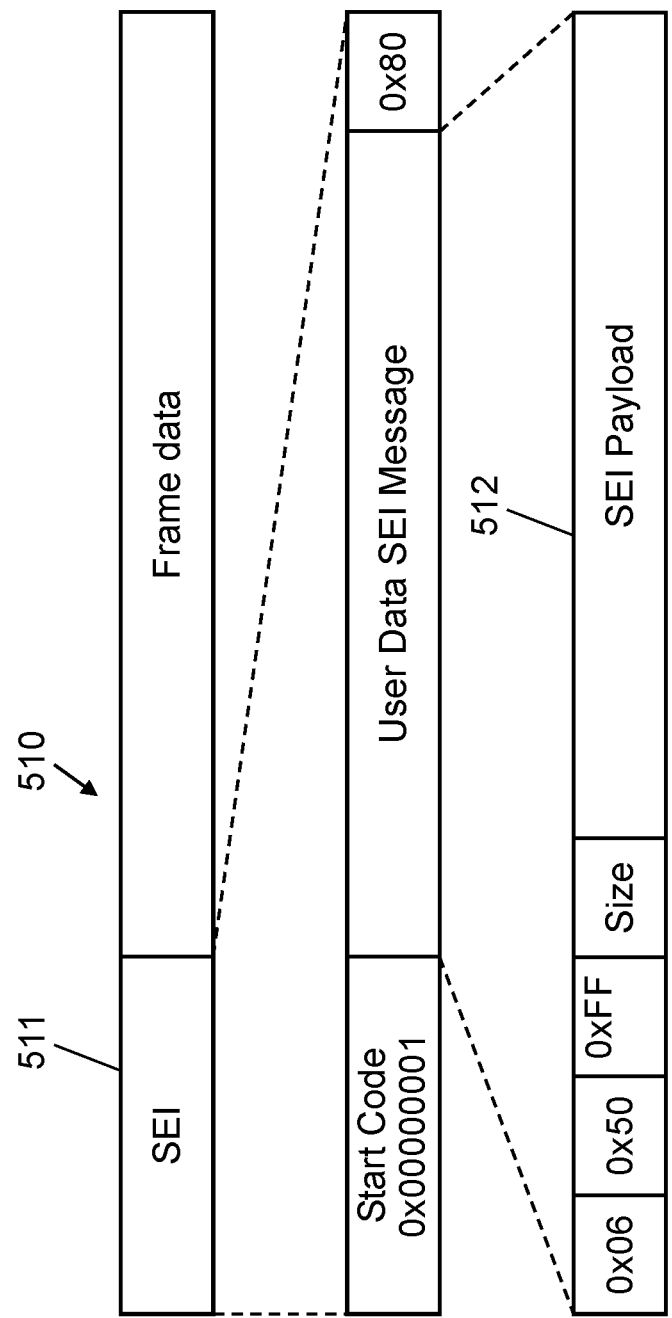
FIG. 5 illustrates an example of encoded frame data.

FIG. 5 illustrates a concrete example of encoded frame data.

1-2 Operation 1-2-1 Operation of Video Recording Device

Figure 7:
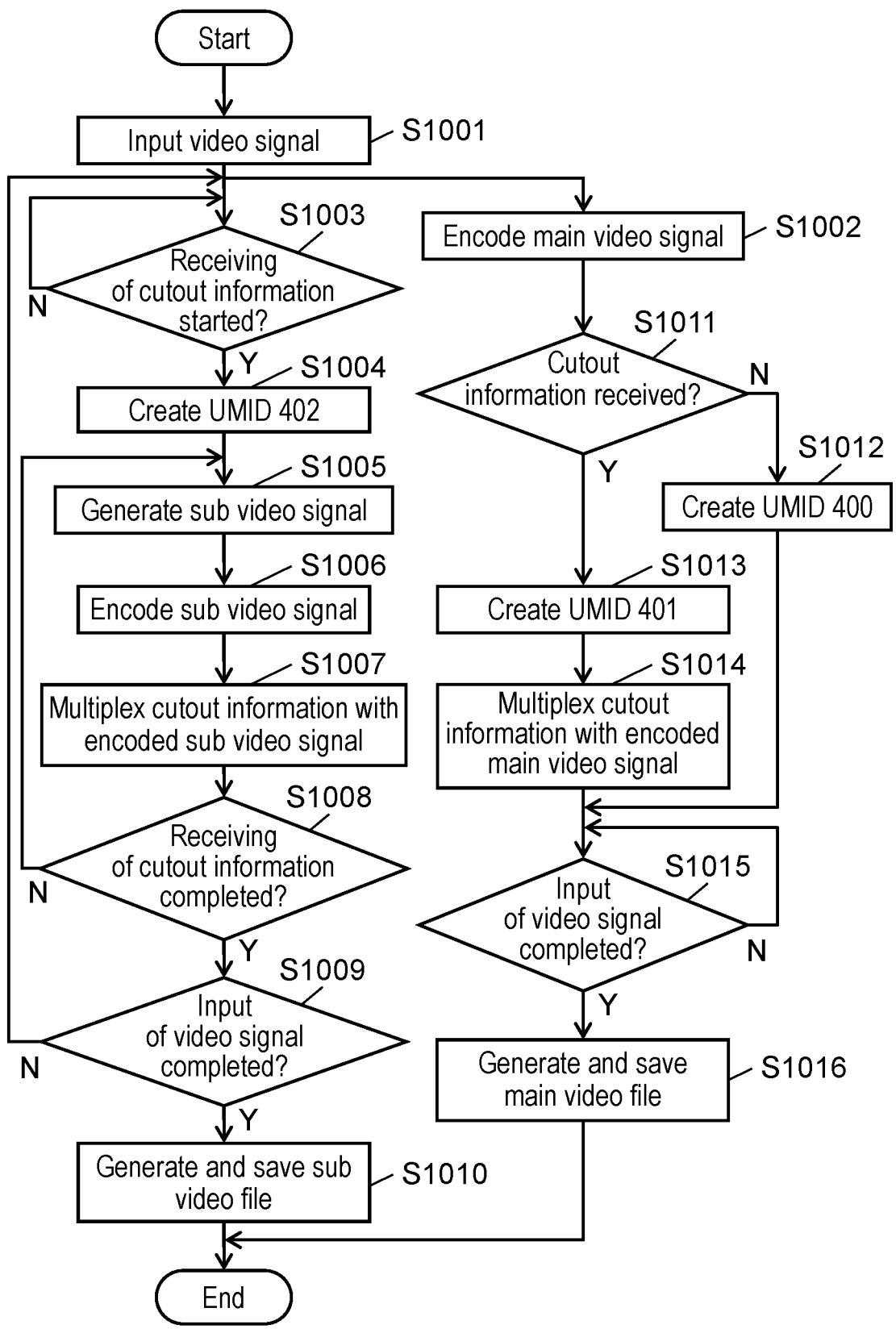
FIG. 7 is a flowchart illustrating operation of a video recording device according to the first embodiment.

The flowchart of FIG. 7 illustrates operation of video recording device 100 recording a video signal.

When shooting is started, video signal input unit 101 inside video recording device 100 receives a main video signal to main video signal transmitting unit 103 (step S1001). Encoder 102 encodes the received video signal (main video signal) (step S1002).

Cutout information receiver 104, if receiving cutout information 500 (an example of subject position information) transmitted from display device 200 (Yes in step S1003), advances its operation to step S1004 (described later). Cutout information 500 is received for each frame (described later).

UMID creation unit 109 creates UMID 402 (an example of second association information) indicating a sub video signal for a sub video file (step S1004). Simultaneously, video signal cutout unit 105 cuts out the sub video signal from the main video signal received based on cutout information 500 received (step S1005).

When recording of the sub video signal is started, encoder 106 encodes the sub video signal (step S1006). Cutout information addition unit 107 multiplexes cutout information 500 received for each frame with sub video data encoded (step S1007). Concretely, cutout information 500 is stored in payload 512 inside SEI (supplemental enhancement information) 511, which is part of frame data 510 shown in FIG. 5.

The multiplexing process of the sub video data with the cutout information by video signal cutout unit 105 continues until the reception of cutout information 500 ends (step S1008).

When input of the video signal ends (Yes in step S1009), file creation unit 108 creates a sub video file from the sub video data and records it on media 111 (step S1010). At this moment, UMID addition unit 110 adds UMID 402 to the sub video file created by file creation unit 108 and records the result on media 111.

Meanwhile, in contrast with the main video signal encoded (step S1002), UMID creation unit 109, if cutout information has not been received (No in step S1011), creates UMID 400 (step S1012); otherwise (Yes in step S1011), creates UMID 401 (an example of first association information) (step S1013).

If cutout information has been received, cutout information addition unit 107 multiplexes cutout information 500 received for each frame with the main video data encoded (step S1014).

When input of the video signal ends (Yes in step S1015), file creation unit 108 creates a main video file from the main video data and records the result on media 111 (step S1016). At this moment, UMID addition unit 110 adds UMID 401 to the main video file with its sub video signal; UMID 400, to the main video file without its sub video signal, and records the result on media 111.

1-2-2 Operation of Display Device

Figure 8:
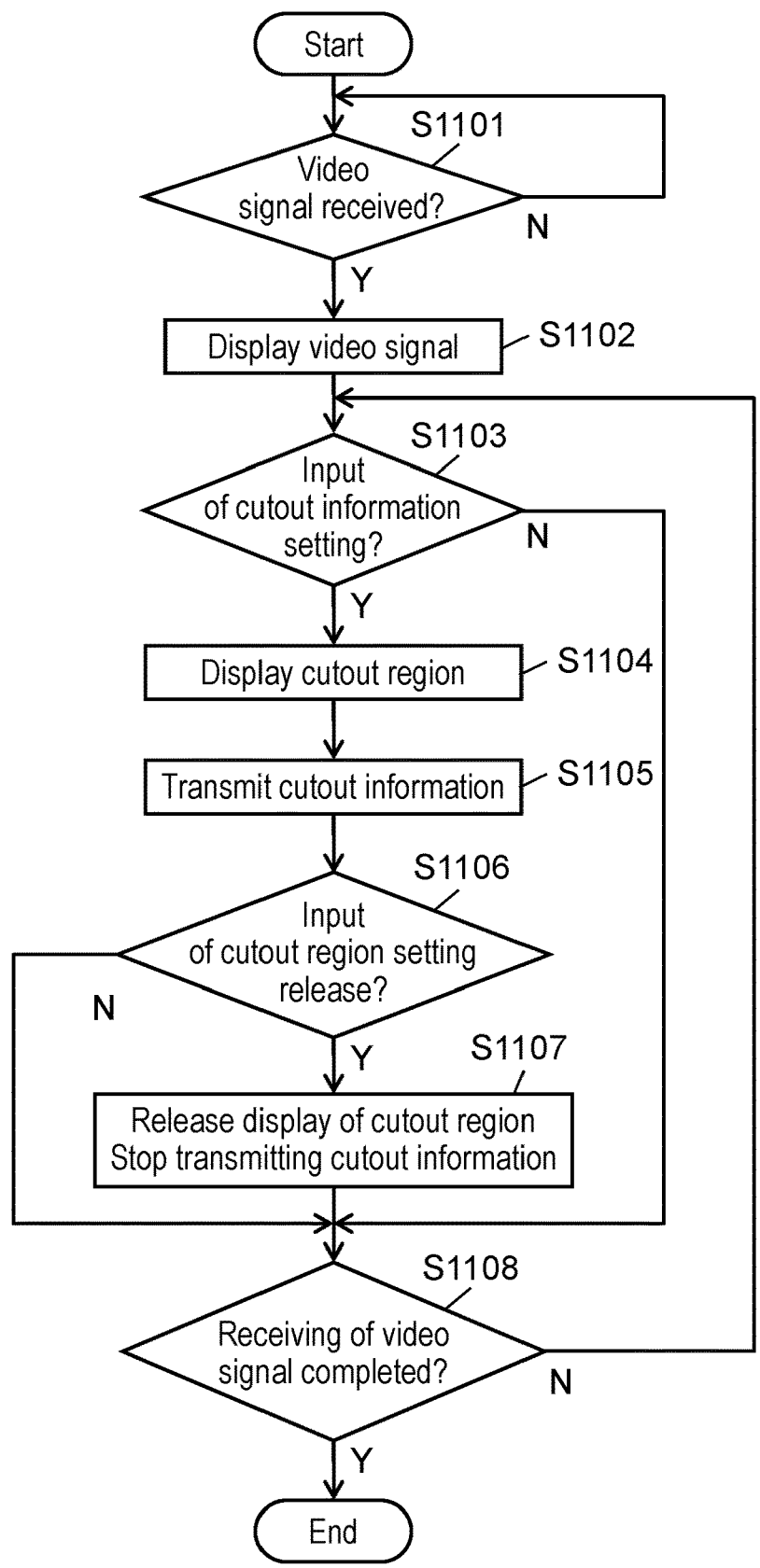
FIG. 8 is a flowchart illustrating operation of a display device according to the first embodiment.

The flowchart of FIG. 8 illustrates display operation of display device 200.

Figure 6A:
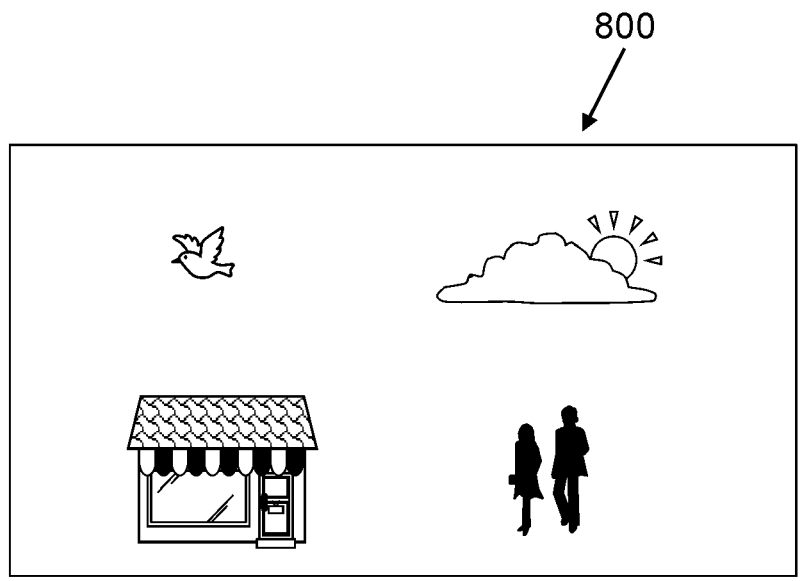
FIG. 6A illustrates a display example of a main video signal.
Figure 6B:
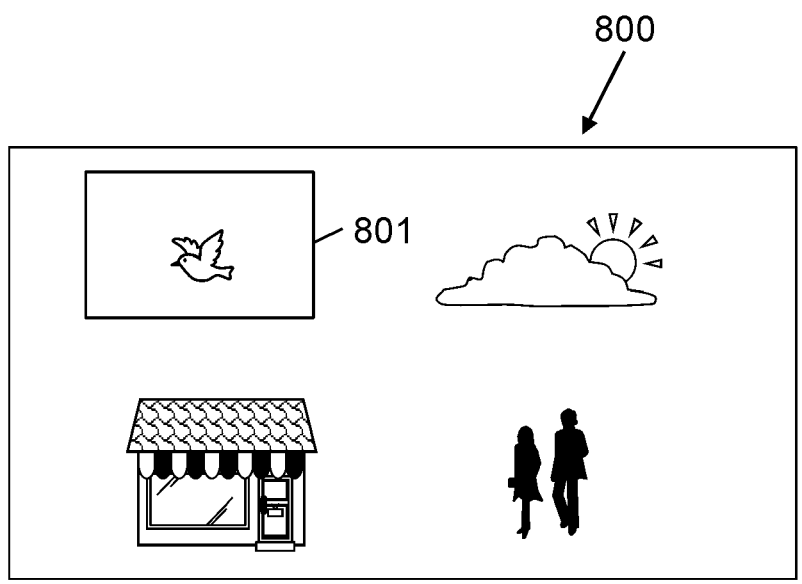
FIG. 6B illustrates a display example of a cutout region in the main video signal.

Display device 200, if video signal receiver 201 receives a main video signal transmitted from main video signal transmitting unit 103 of video recording device 100 (Yes in step S1101), displays the video signal received by display unit 202 as shown in FIG. 6A (step S1102). Based on the video signal displayed by display unit 202, a user performs input operation to set cutout information 500 through cutout information setting unit 203 (step S1103). Concretely, the user performs input operation to select a region surrounding a desired subject of entire video signal 800. This operation results in cutout region 801 selected displayed in entire video signal 800 as shown in FIG. 6B (step S1104). Cutout information 500 having been set is transmitted to video recording device 100 for each frame through cutout information transmitting unit 204 (step S1105).

Cutout information 500 transmitted from cutout information transmitting unit 204 is received by cutout information receiver 104 inside video recording device 100 as described above.

If setting of the cutout region is released through input operation of the user (Yes in step S1106), display unit 202 releases display of cutout region 801 shown in FIG. 6B and returns the display to that shown in FIG. 6A, and cutout information transmitting unit 204 stops transmitting cutout information 500 (step S1107).

When receiving of the video signal from video recording device 100 ends (Yes in step S1108), the process is terminated.

As long as setting of the cutout region is not released (No in step S1106) and at the same time receiving of a video signal is not terminated (No in step S1108), the process from step S1103 is continued. Here, when a new cutout region is input and set due to movement of a desired subject for example (step S1103), the new cutout region is displayed (step S1104). At this moment, the previous cutout region may be automatically released, or may be retained. Cutout information setting unit 203 generates cutout information (e.g., 501 of FIG. 4B) corresponding to the new cutout region, and the cutout information is transmitted to video recording device 100.

Note that each step of the flowcharts of FIGS. 7 and 8 does not need to follow the same sequence as described above. Some steps may be interchanged, and may be executed simultaneously. For example, UMIDs 400, 401, and 402 may be generated when the files are created or at other timing.

1-3 Features

Video recording device 100 according to the above-described embodiment generates a sub video signal by cutting out part of one main video signal and records the sub video signal associated with the original main video signal, thereby generating a wide variety of images with simple operation. That is, two or more video signals can be generated from one video signal. For example, by generating a sub video signal produced by cutting out part of a main video signal with high resolution, two or more video signals with favorable image quality can be generated.

The device can generate two or more images from one image, and thus one camera functions as multi-cameras.

UMID 401 is given to a main video file; UMID 402, to its sub video file, which results in the main and sub video files with the same material number. This allows the files to be identified as a pair simultaneously recorded and to be associated with each other.

Cutout information is multiplexed with main and sub video data encoded, which allows only cutout information to be read from video data, and thus a user can learn the content of the cutout information without reproducing the video signal.

In the above-described embodiment, it is also possible to generate one or more sub video data concurrently while shooting a video signal by one camera, achieving rapid and real-time editing of a video signal.

Second Exemplary Embodiment

Hereinafter, a description is made of video recording system 2 according to the second exemplary embodiment. A component or function same as that of the first embodiment is given the same reference mark and its description may be omitted.

2-1 Configuration 2-1-1 Video Recording System

Figure 9:
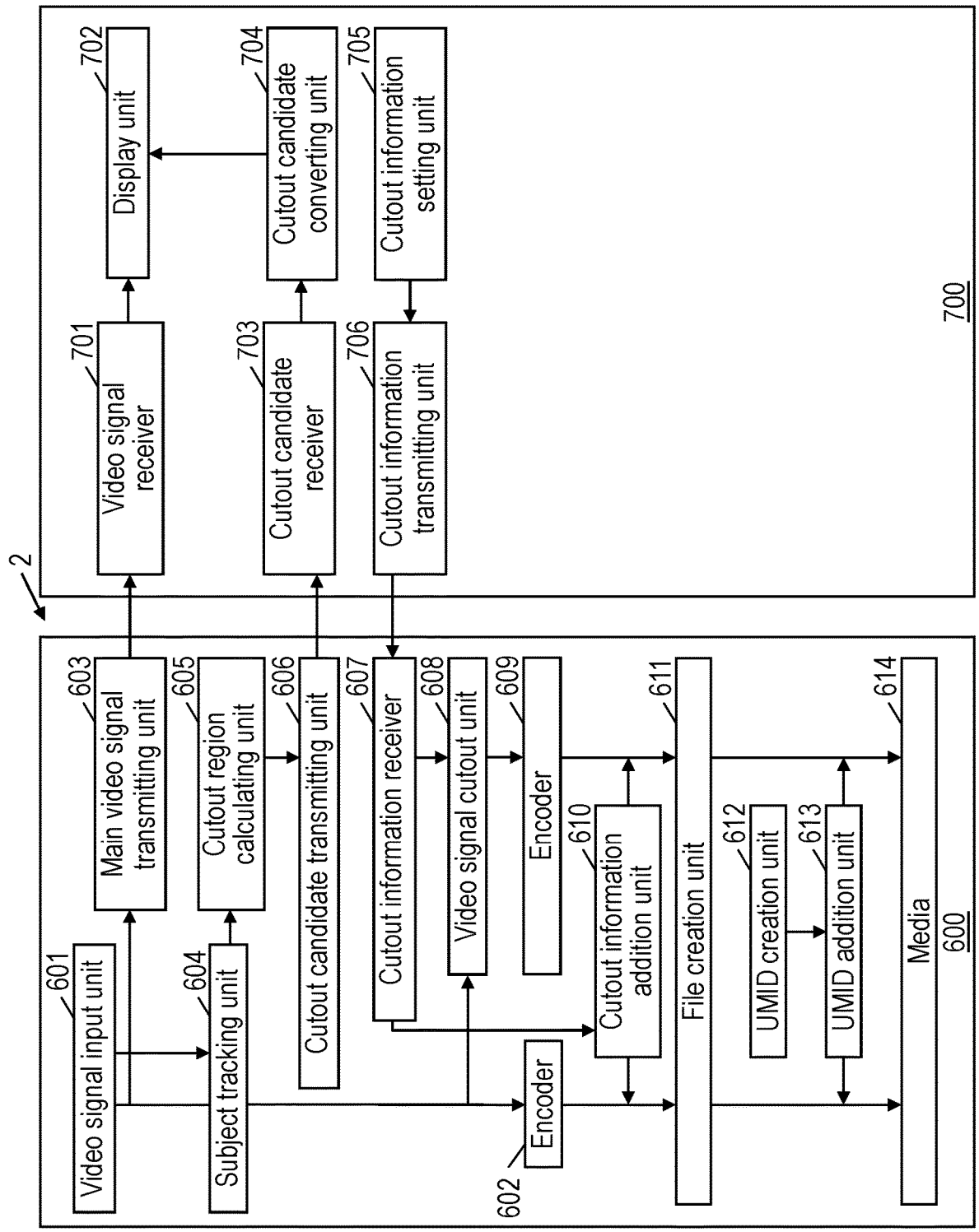
FIG. 9 is a block diagram of a video recording system according to the second exemplary embodiment.

FIG. 9 illustrates the configuration of video recording system 2 of the present disclosure. Video recording system 2 according to the second embodiment is different from the first embodiment in that video recording device 600 calculates one or more cutout candidate information, which allows cutout information to be selectable.

2-1-2 Video Recording Device

Video recording device 600 includes video signal input unit 601, encoder 602, main video signal transmitting unit 603, subject tracking unit 604, cutout region calculating unit 605, cutout candidate transmitting unit 606, cutout information receiver 607, video signal cutout unit 608, encoder 609, cutout information addition unit 610, file creation unit 611, UMID creation unit 612, UMID addition unit 613, and media 614.

Video signal input unit 601 inputs a video signal. Encoder 602 encodes the main video signal output from video signal input unit 601. Main video signal transmitting unit 603 transmits the main video signal input from video signal input unit 601 to display device 700. Subject tracking unit 604 tracks two or more subjects contained in the main video signal output from video signal input unit 601. Cutout region calculating unit 605 calculates a region covering moving subjects by subject tracking unit 604 to create one or more cutout candidate information (described later). Cutout candidate transmitting unit 606 transmits the one or more cutout candidate information calculated by cutout region calculating unit 605 to display device 700. Cutout information receiver 607 receives cutout information created by display device 700. Video signal cutout unit 608 creates a sub video signal based on the cutout information received by cutout information receiver 607. Encoder 609 encodes the sub video signal output from video signal cutout unit 608. Cutout information addition unit 610 multiplexes the cutout information received by cutout information receiver 607 with main video data encoded by encoder 602; and with sub video data encoded by encoder 609. File creation unit 611 creates a main video file from the main video data to which the cutout information has been added by cutout information addition unit 610; and creates a sub video file from the sub video data to which the cutout information has been added. UMID creation unit 612 creates UMIDs for the main video file and sub video file created by file creation unit 611. UMID addition unit 613 adds the UMID for the main video signal created by UMID creation unit 612 to the main video file, and adds the UMID for the sub video signal to the sub video file. Media 614 records the main and sub video files to which the UMIDs have been added.

2-1-3 Display Device

Display device 700 includes video signal receiver 701, display unit 702, cutout candidate receiver 703, cutout candidate converting unit 704, cutout information setting unit 705, and cutout information transmitting unit 706.

Video signal receiver 701 receives a main video signal transmitted from main video signal transmitting unit 603. Display unit 702 displays the main video signal received by video signal receiver 701. Cutout candidate receiver 703 receives one or more cutout candidate information transmitted from cutout candidate transmitting unit 606 of video recording device 600. Cutout candidate converting unit 704 converts the cutout candidate information received by cutout candidate receiver 703 and outputs the result to display unit 702. Cutout information setting unit 705 sets a range of the main video signal to be cut out based on the video signal on display unit 702. Cutout information transmitting unit 706 transmits the cutout information set by cutout information setting unit 705 to the video recording device.

2-2 Operation 2-2-1 Operation of Video Recording Device

Figure 10:
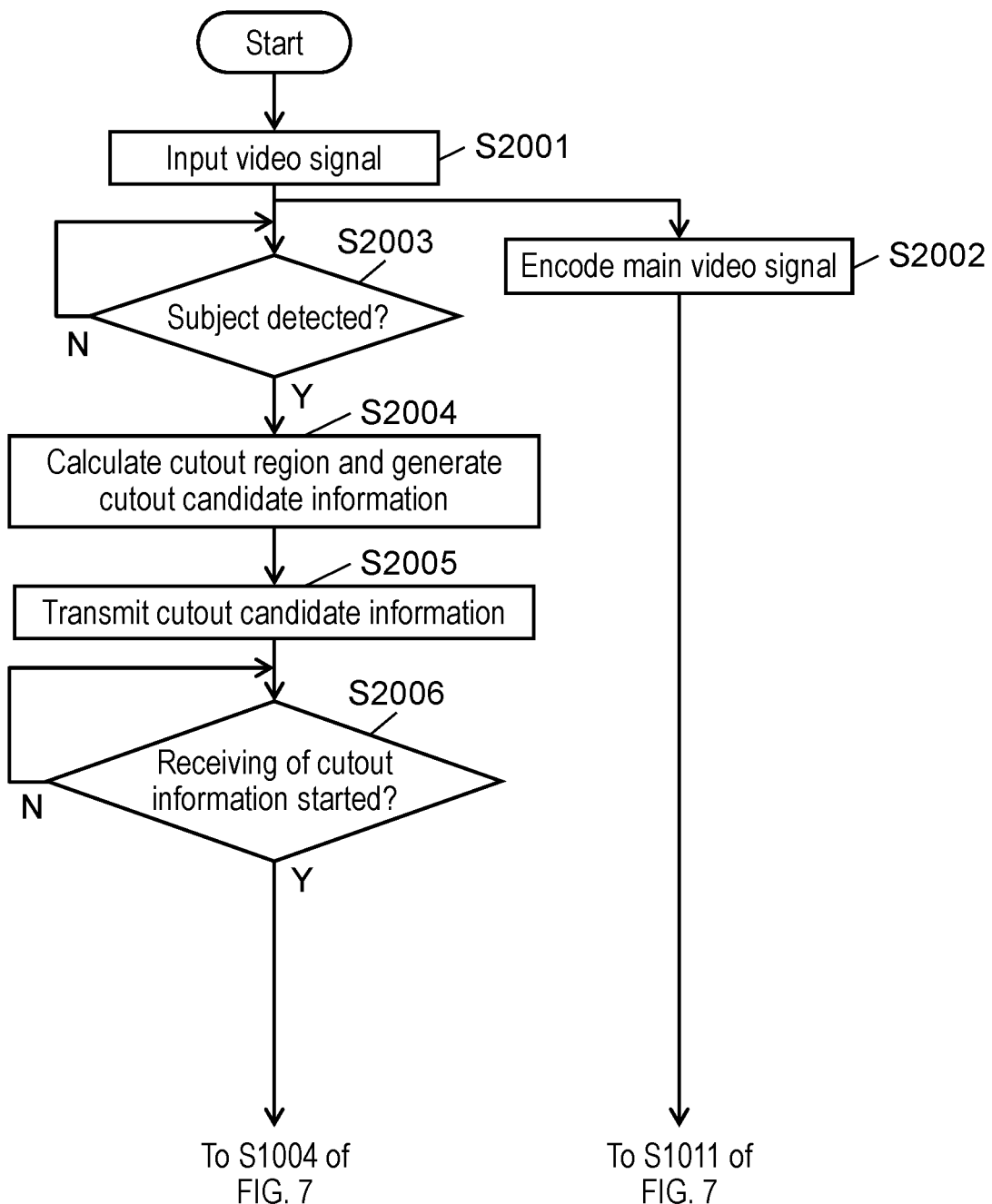
FIG. 10 is a flowchart illustrating operation of a video recording device according to the second embodiment.

The flowchart of FIG. 10 illustrates operation of video recording device 600 recording a video signal.

Figure 12:
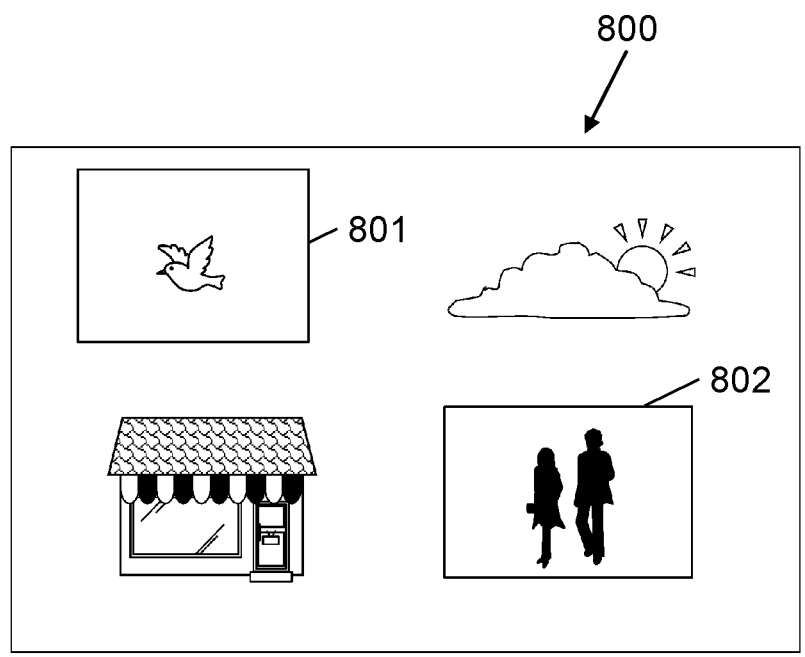
FIG. 12 illustrates a display example of a main video signal and its sub video signal.
Figure 13A:
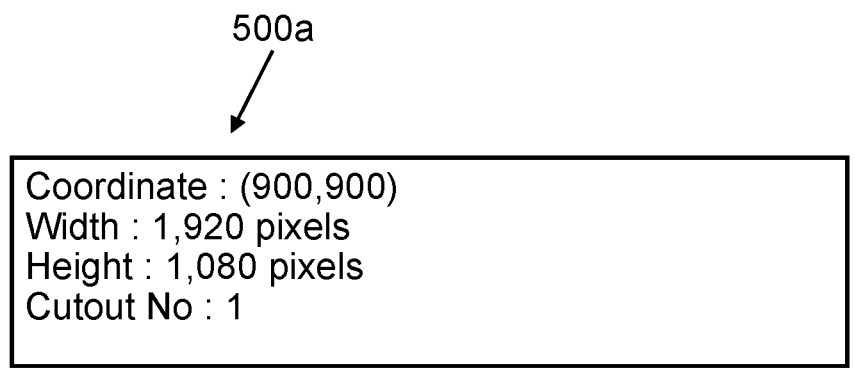
FIG. 13A illustrates an example of cutout candidate information.
Figure 13B:
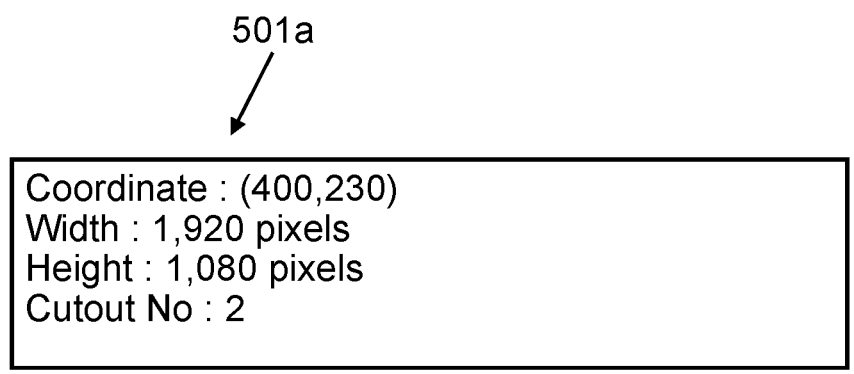
FIG. 13B illustrates an example of cutout candidate information.

When shooting is started, video signal input unit 601 inside video recording device 600 transmits a main video signal to main video signal transmitting unit 603 (step S2001). Encoder 602 encodes the video signal (main video signal) having been input (step S2002). If subject tracking unit 604 detects two or more subjects (e.g., as shown in FIG. 12, cutout region 801 containing a bird as a subject and cutout region 802 containing a person as a subject) contained in the main video signal (Yes in step S2003), cutout region calculating unit 605, based on subjects detected, calculates a region covering the positions of the subjects and creates one or more cutout candidate information (e.g., cutout candidate information 500a of FIG. 13A and cutout candidate information 501a of FIG. 13B) (an example of subject position candidate information) (step S2004). Cutout candidate transmitting unit 606 transmits cutout candidate information 500a and 501a created by cutout region calculating unit 605, to display device 700 (step S2005).

When cutout information receiver 607 receives cutout information (e.g., cutout information 500 shown in FIG. 4A) (an example of subject position information) transmitted from display device 700 (Yes in step S2006), cutout information receiver 607 advances its operation to step S1004 of FIG. 7, and after that operates in the same way as in the first embodiment. That is, UMID creation unit 612 creates UMID 402 (an example of second association information) indicating a sub video signal for a sub video file (step S1004). Simultaneously, video signal cutout unit 608 cuts out and generates a sub video signal from the main video signal received based on cutout information 500 received (step S1005). When recording of the sub video signal generated is started, encoder 606 encodes the sub video signal (step S1006). Cutout information addition unit 610 multiplexes cutout information 500 received for each frame with the sub video data encoded (step S1007). The multiplexing process of the sub video data with the cutout information by video signal cutout unit 608 continues until the reception of cutout information 500 ends (step S1008). When input of the video signal ends (Yes in step S1009), file creation unit 611 creates a sub video file from the sub video data and records the result on media 614 (step S1010). At this moment, UMID addition unit 613 adds UMID 402 to the sub video file created by file creation unit 611 and records the result on media 614.

Meanwhile, after the main video signal is encoded in step S2002, cutout information receiver 607 advances its operation to step S1011 of FIG. 7, and after that operates in the same way as in the first embodiment. That is, if cutout information has not been received for the main video signal encoded (No in step S1011), UMID creation unit 612 creates UMID 400 (step S1012); otherwise (Yes in step S1011), creates UMID 401 (an example the first association information) (step S1013). If cutout information has been received, cutout information addition unit 610 multiplexes cutout information 500 received for each frame with the main video data encoded (step S1014). When input of the video signal ends (Yes in step S1015), file creation unit 611 creates a main video file from the main video data and records the result on media 614 (step S1016). At this moment, UMID addition unit 613 adds UMID 401 to the main video file with its sub video signal; UMID 400, to the main video file without its sub video signal, and records the result on media 614.

2-2-2 Operation of Display Device

Figure 11:
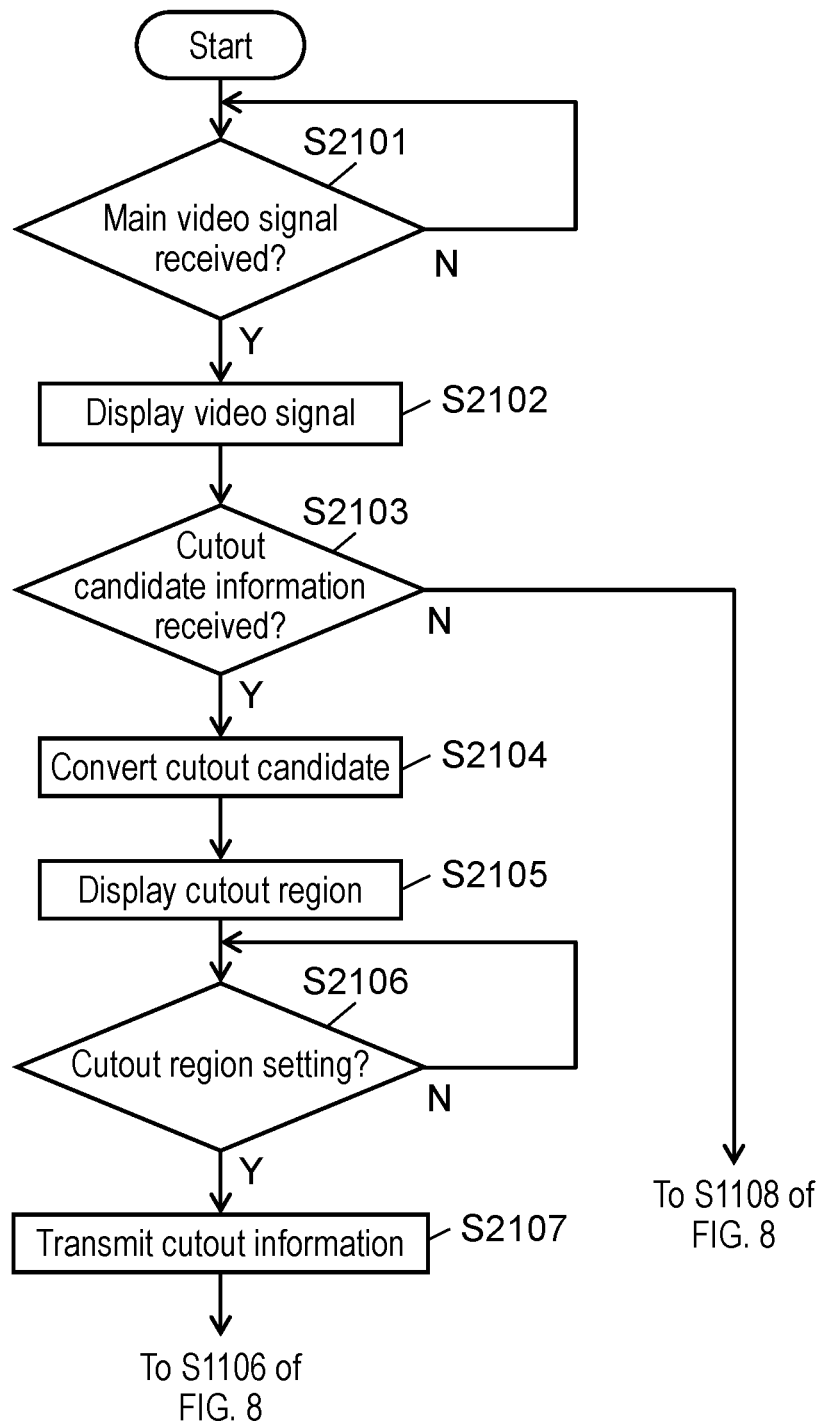
FIG. 11 is a flowchart illustrating operation of a display device according to the second embodiment.

The flowchart of FIG. 11 illustrates display operation of display device 700.

If video signal receiver 701 receives a main video signal transmitted from transmitting unit 603 of video recording device 600 (Yes in step S2101), display device 700 displays the video signal received by display unit 702 as shown in FIG. 6A (step S2102).

Besides, in display device 700, cutout candidate receiver 703 receives cutout candidate information 500a and 501a transmitted from cutout candidate transmitting unit 606 of video recording device 600 described above (Yes in step S2103). In this case, cutout candidate converting unit 704 instructs display unit 702 on a cutout position based on cutout candidate information 500a and 501a received by cutout candidate receiver 703 (step S2104). At this moment, as shown in FIG. 12, display unit 702 displays cutout region 801 corresponding to cutout candidate information 500a and cutout region 802 corresponding to cutout candidate information 501a on entire video signal 800 (step S2105).

Based on the video signal displayed on display unit 702, a user performs input operation to set cutout candidate information 500a or 501a as cutout information through cutout information setting unit 705 (Yes in step S2106).

If cutout information 500 has been set, cutout information transmitting unit 706 transmits cutout information 500 (step S2107). Cutout information 500 transmitted from cutout information transmitting unit 706 is received by cutout information receiver 607 inside video recording device 600.

Subsequently, the process flow proceeds to step S1106 of FIG. 8, and then the operation is performed in the same way as in the first embodiment. In other words, if setting of the cutout region has been released through input operation of a user (Yes in step S1106), display unit 702 releases the display of cutout region 801 shown in FIG. 12, and returns the display to that shown in FIG. 6A, while cutout information transmitting unit 706 stops transmitting cutout information 500 (step S1107).

Meanwhile, if cutout candidate receiver 703 has not received cutout candidate information (No in step S2103), the process flow proceeds to step S1108 of FIG. 8. When receiving of the video signal from video recording device 600 ends (Yes in step S1108), the process is terminated.

Here, the process may be performed as follows. That is, cutout information setting unit 705 changes the setting from cutout candidate information 500a to 501a during recording, and cutout information transmitting unit 706 transmits cutout information 501 to video recording device 600. In this case, cutout information 501 transmitted from cutout information transmitting unit 706 is received by cutout information receiver 607 inside video recording device 600. Based on cutout information 501 received, video signal cutout unit 608 changes the position of a region to be cut out from the main video signal. Cutout information addition unit 610 multiplexes cutout information 501 received by cutout information receiver 607 with main video data encoded by encoder 602; and with sub video data encoded by encoder 609. Then, file creation unit 611 records the video data with its cutout information changed, in the main video file and the sub video file. In this case, if the subject as a cutout target has been changed during the process, the new subject may be recorded as another sub video data, or may be recorded continuously after the previous sub video data before changing, to generate one sub video data.

Each step of the flowcharts of FIGS. 10 and 11 does not need to follow the same sequence as described above. Some steps may be interchanged, and may be executed simultaneously. For example, UMIDs 400, 401, and 402 may be generated when the files are created or at other timing.

2-3 Features

The above-described exemplary embodiment, besides the advantages of the first embodiment, automatically detects a cutout region suitable for cutting out one video signal and displays the result, thereby generating a wide variety of images from one image with simpler operation.

If there is two or more cutout candidate information, the changing point of a cutout target is known in response to actions of a tracked subject, which allows the changing position of the cutout target to be learned. For example, video recording device 600, when detecting a subject becomes impossible, stops transmitting cutout candidate information. At this moment, the user may set another cutout candidate information from display device 700.

Third Exemplary Embodiment

Hereinafter, a description is made of video recording system 3 according to the third exemplary embodiment. A component or function same as that of the first and second embodiments is given the same reference mark and its description may be omitted.

3-1 Configuration 3-1-1 Video Recording System

Figure 14:
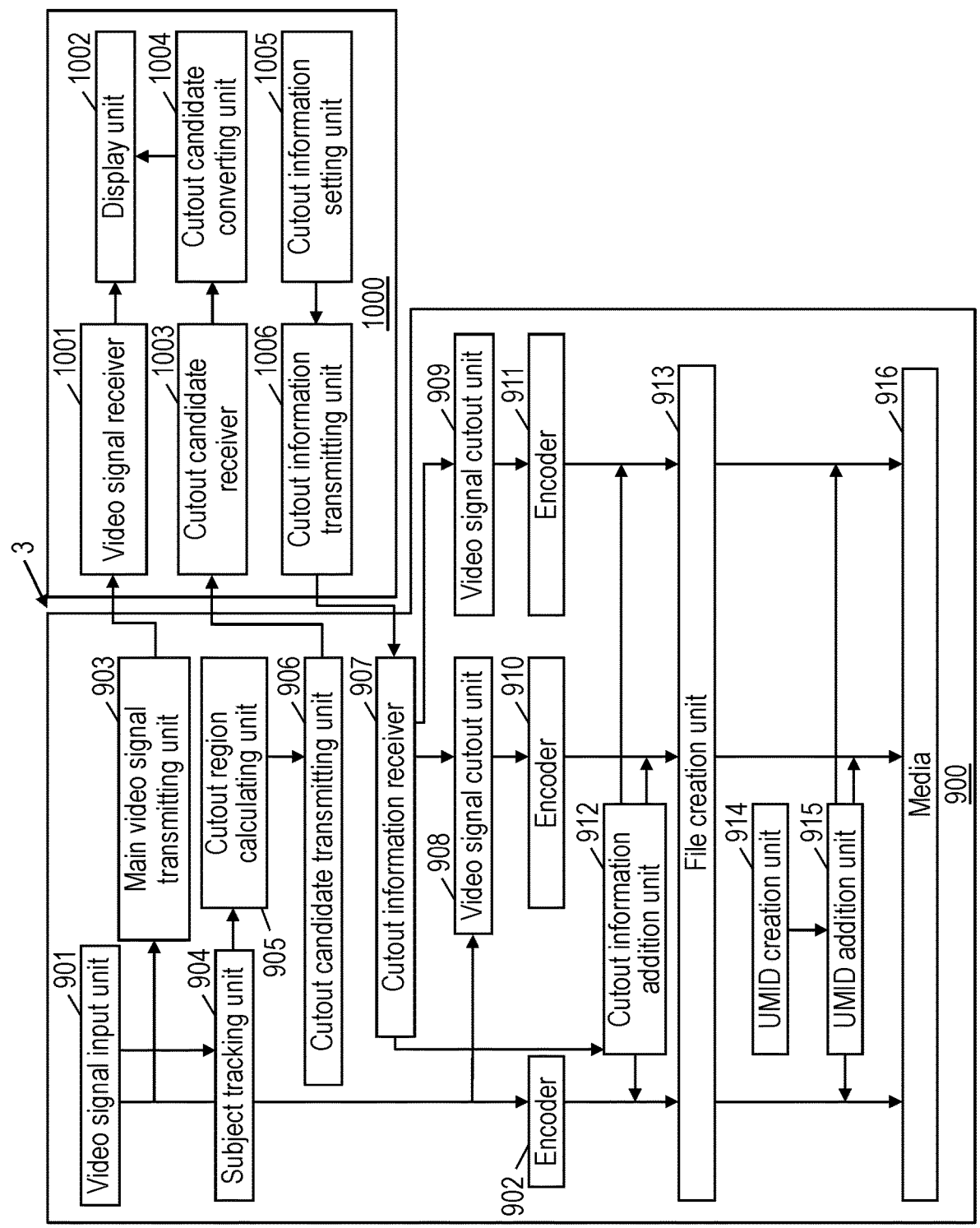
FIG. 14 is a block diagram of a video recording system according to the third exemplary embodiment.

FIG. 14 illustrates the configuration of video recording system 3 of the present disclosure. Video recording system 3 according to the third embodiment is different from the first and second in that video recording device 900 calculates two or more cutout regions and display device 1000 transmits two or more cutout information concurrently based on the calculation results.

3-1-2 Video Recording Device

Video recording device 900 includes video signal input unit 901, encoder 902, main video signal transmitting unit 903, subject tracking unit 904, cutout region calculating unit 905, cutout candidate transmitting unit 906, cutout information receiver 907, video signal cutout unit 908, video signal cutout unit 909, encoder 910, encoder 911, cutout information addition unit 912, file creation unit 913, UMID creation unit 914, UMID addition unit 915, and media 916.

Video signal input unit 901 inputs a video signal. Encoder 902 encodes the main video signal output from video signal input unit 901. Main video signal transmitting unit 903 transmits the main video signal output from video signal input unit 901 to display device 1000. Subject tracking unit 904 tracks two or more subjects contained in the main video signal output from video signal input unit 901. Cutout region calculating unit 905 calculates a region covering moving subjects tracked by tracking unit 904. Cutout candidate transmitting unit 906 transmits two or more cutout information calculated by cutout region calculating unit 905, to display device 1000. Cutout information receiver 907 receives cutout information created by display device 1000. Video signal cutout unit 908 creates a sub video signal based on the first cutout information received by cutout information receiver 907. Video signal cutout unit 909 creates a sub video signal based on the second cutout information received by cutout information receiver 907. Encoder 910 encodes the sub video signal output from video signal cutout unit 908. Encoder 911 encodes the sub video signal output from video signal cutout unit 909. Cutout information addition unit 912 multiplexes main video data that is produced by encoder 902 encoding cutout information received by cutout information receiver 907; and sub video data that is produced by encoder 910 and encoder 911 encoding the cutout information. File creation unit 913 creates a main video file from the main video data to which the cutout information has been added by cutout information addition unit 912, and creates a sub video file from the sub video data to which the cutout information has been added by cutout information addition unit 912. UMID creation unit 914 creates UMIDs for the main video file and for the sub video file created by file creation unit 913. UMID addition unit 915 adds the UMID for the main video signal created by UMID creation unit 914 to the main video file, and adds the UMID for the sub video signal created by UMID creation unit 914, to the sub video file. Media 916 records the main and sub video files to which the UMIDs have been added.

3-1-3 Display Device

Display device 1000 includes video signal receiver 1001, display unit 1002, cutout candidate receiver 1003, cutout candidate converting unit 1004, cutout information setting unit 1005, and cutout information transmitting unit 1006.

Video signal receiver 1001 receives a main video signal transmitted from main video signal transmitting unit 903. Display unit 1002 displays the main video signal received by video signal receiver 1001. Cutout candidate receiver 1003 receives two or more cutout information transmitted from cutout candidate transmitting unit 906. Cutout candidate converting unit 1004 converts the cutout information received by cutout candidate receiver 1003 and outputs the result to display unit 1002. Cutout information setting unit 1005 sets a range within which the main video signal is cut out based on the video signal on display unit 1002. Cutout information transmitting unit 1006 transmits the cutout information set by cutout information setting unit 1005, to the video recording device.

3-2 Operation 3-2-1 Operation of Video Recording Device

Hereinafter, a description is made of operation of video recording device 900 according to the embodiment referring to FIGS. 7 and 10 in the same way as that of video recording device 100 of the first embodiment and video recording device 600 of the second embodiment.

Similarly to the second embodiment, when shooting is started, video signal input unit 901 inside video recording device 900 transmits a main video signal to main video signal transmitting unit 903 (step S2001 of FIG. 10). Encoder 902 encodes the video signal (main video signal) having been input (step S2002 of FIG. 10).

Similarly to the second embodiment, subject tracking unit 904 detects two or more subjects, for example as shown in FIG. 12, contained in the main video signal (in this example, cutout region 801 containing a bird as a subject and cutout region 802 containing a person as a subject). Cutout region calculating unit 905, based on subjects detected, calculates a region covering the positions of the subjects, and creates one or more cutout candidate information (here, cutout candidate information 500a of FIG. 13A and cutout candidate information 501a of FIG. 13B) (an example of subject position candidate information) (steps S2003 and S2004 of FIG. 10). Cutout candidate transmitting unit 906 transmits cutout candidate information 500a and 501a created by cutout region calculating unit 605, to display device 1000 in the same way as the second embodiment (step S2005 of FIG. 10).

When cutout information receiver 907 receives two or more cutout information (e.g., cutout information 500 and 501 shown in FIG. 4A) (an example of subject position information) (Yes in step S2006 of FIG. 10), cutout information receiver 907 advances its operation to step S1004 of FIG. 7.

UMID creation unit 914 creates UMIDs 402 and 403 (FIGS. 3C and 3D) (an example of second association information) indicating sub video signals for sub video files (step S1004 of FIG. 7). Simultaneously, video signal cutout units 908 and 909 cut out and generate sub video signals from the main video signal received based on cutout information 500 and 501 received (step S1005 of FIG. 7). When recording of the two sub video signals generated is started, encoders 910 and 911 encode respective sub video signals (step S1006 of FIG. 7). Cutout information addition unit 912 multiplexes cutout information 500 and 501 received for each frame with respective two sub video data encoded (step S1007 of FIG. 7). Multiplexing the sub video data with the cutout information by video signal cutout units 908 and 909 continues until receiving of cutout information 500 and 501 ends (step S1008 of FIG. 7). When input of the video signals ends (Yes in step S1009), file creation unit 913 creates respective sub video files from the two sub video data and records the results on media 916 (step S1010 of FIG. 7). At this moment, UMID addition unit 915 respectively adds UMIDs 402 and 403 to the two sub video files created by file creation unit 913 and records the results on media 916.

Meanwhile, after the main video signal is encoded in step S2002, the process flow proceeds to step S1011 of FIG. 7.

For the encoded main video signal (step S2002 of FIG. 10), if cutout information has not been received (No in step S1011 of FIG. 7), UMID creation unit 914 creates UMID 400 (step S1012 of FIG. 7); if cutout information has been received (Yes in step S1011 of FIG. 7), creates UMID 401 (an example of first association information) (step S1013 of FIG. 7). If cutout information has been received, cutout information addition unit 912 multiplexes cutout information 500 and 501 received for each frame with the encoded main video data (step S1014 of FIG. 7). When input of the video signals ends (Yes in step S1015 of FIG. 7), file creation unit 913 creates a main video file from the main video data and records the result on media 916 (step S1016 of FIG. 7). At this moment, UMID addition unit 615 adds UMID 401 to the main video file with its sub video signal; UMID 400, to the main video file without its sub video signal, and records the result on media 916.

3-2-2 Operation of Display Device

Hereinafter, a description is made of operation of display device 1000 according to the embodiment referring to FIGS. 8 and 11 similarly to display device 200 of the first embodiment and display device 700 of the second embodiment.

If video signal receiver 1001 receives a main video signal transmitted from transmitting unit 903 of video recording device 900 (Yes in S2101 of FIG. 11), display device 1000 displays the video signal received by display unit 1002 as shown in FIG. 6A (step S2102 of FIG. 11).

Besides, in display device 1000, cutout candidate receiver 1003 receives cutout candidate information 500a and 501a transmitted from cutout candidate transmitting unit 906 of video recording device 900 described above (Yes in step S2103 of FIG. 11). In this case, cutout candidate converting unit 1004 instructs display unit 1002 on a cutout position based on cutout candidate information 500a and 501a received by cutout candidate receiver 1003 (step S2104 of FIG. 11). At this moment, as shown in FIG. 12, display unit 1002 displays cutout region 801 corresponding to cutout candidate information 500a and cutout region 802 corresponding to cutout candidate information 501a on entire video signal 800 (step S2105 of FIG. 11).

Based on the video signal displayed on display unit 1002, a user performs input operation to set cutout candidate information 500a and 501a as cutout information through cutout information setting unit 1005 (Yes in step S2106 of FIG. 11). Here, the user selects cutout regions 801 and 802, and cutout candidate information 500a and 501a are respectively set as cutout information 500 and 501 through this input operation.

Cutout information transmitting unit 1006 transmits cutout information 500 and 501 set by cutout information setting unit 1005, to video recording device 900 (step S2107 of FIG. 11). Cutout information 500 and 501 transmitted from cutout information transmitting unit 1006 is received by cutout information receiver 907 inside video recording device 900.

Subsequently, the process flow proceeds to step S1106 of FIG. 8. If setting of the cutout region has been released through input operation of the user (Yes in step S1106 of FIG. 8), display unit 1002 releases the display of cutout regions 801 and 802 shown in FIG. 12, and returns the display to that shown in FIG. 6A, while cutout information transmitting unit 1006 stops transmitting cutout information 500 and 501 (step S1107 of FIG. 8). Here, if setting of the cutout region has been released, the process may be performed for only one of cutout regions 801 and 802. In this case, cutout information transmitting unit 1006 stops transmitting only one of cutout information 500 and 501.

Meanwhile, if cutout candidate receiver 1003 has not received cutout candidate information (No in step S2103 of FIG. 11), the process flow proceeds to step S1108 of FIG. 8.

3-3 Features

The above-described embodiment, besides the advantages of the first and second embodiments, automatically detects two or more cutout regions suitable for cutting out from one video signal and allows them to be simultaneously selected, thereby generating two or more video signals from one image with simpler operation.

Besides, a main video signal can be associated with its first and second sub video signals.

Here, two cutout information is exemplified; three or more information as well can be processed by increasing the numbers of video signal cutout units and encoders.

Fourth Exemplary Embodiment

Figure 15:
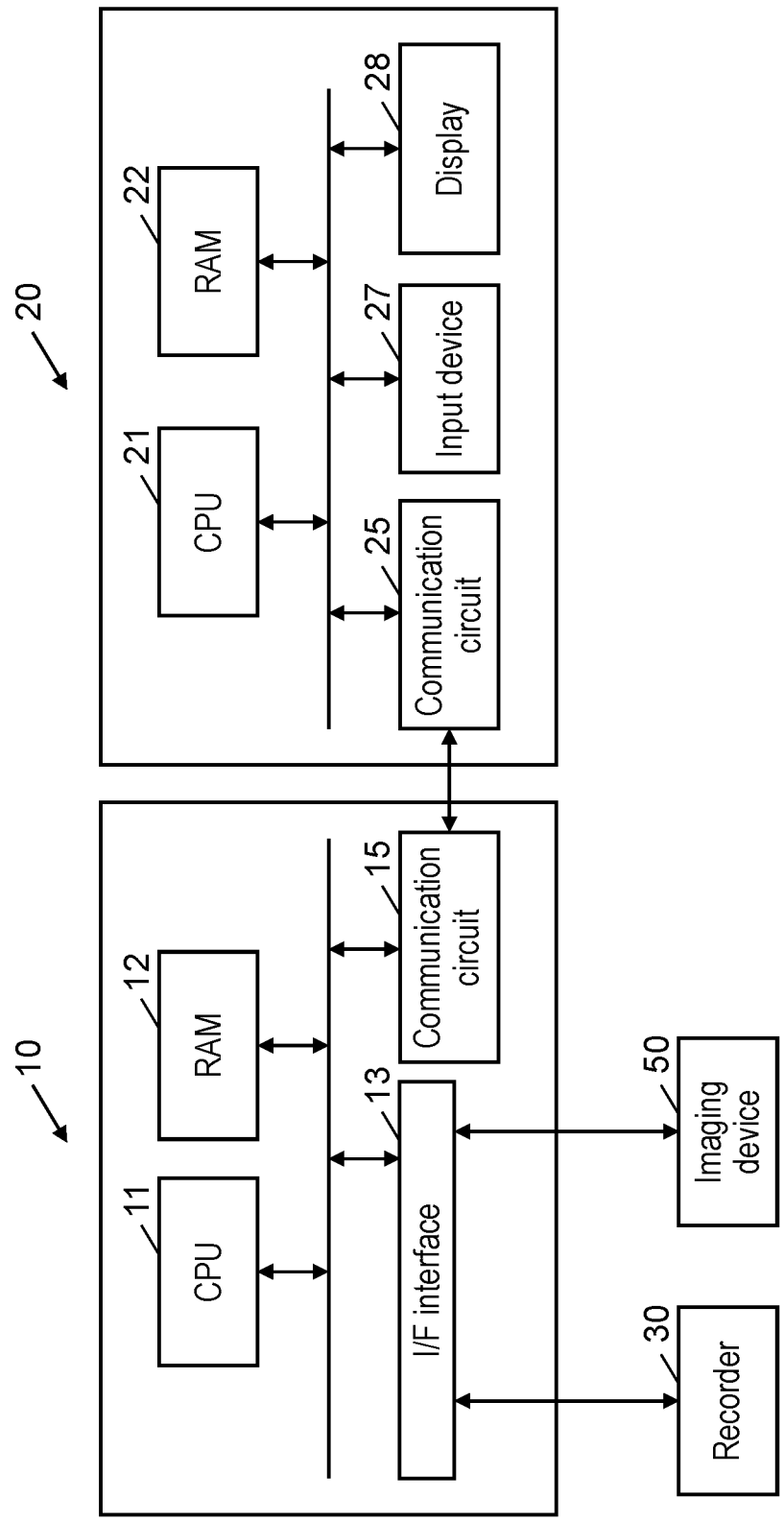
FIG. 15 is a block diagram of a video recording system according to the fourth exemplary embodiment.

FIG. 15 schematically illustrates the structures of video recording systems 1, 2, and 3 (an example of a video processing system) according to the first through third embodiments described above. Reference mark 10 shows the configuration of video recording devices 100, 600, and 900 according to the first through third embodiments. Reference mark 20 shows the configuration of display devices 200, 700, and 1000 according to the first through third embodiments.

Video recording device 10 (an example of a video processing device) includes CPU 11, RAM 12, I/O interface 13 (an example of a first receiver), and communication circuit 15, all of which compose a control circuit connected through a bus with one another. CPU 11 (an example of the controller) controls processes and signal transmission in each component inside video recording device 10 based on predetermined programs. RAM 12 stores programs and data required for processing. I/O interface 13 (an example of the first receiver) inputs and outputs data from and to recorder 30 composed of media 111, 614, and 916 or other components. I/O interface 13 inputs data such as video and audio data from imaging device 50 such as a camera. Communication circuit 15 (an example of the second receiver) is connected with another device such as display device 20 to send and receive signals.

CPU 11 executes predetermined programs to perform operation and functions of components such as video signal cutout units 105, 608, 908, and 909; encoders 102, 106, 602, 609, 902, 910, and 911; cutout information addition units 107, 610, and 912; file creation units 108, 611, and 913; UMID creation units 109, 612, and 914; UMID addition units 110, 613, and 915; subject tracking units 604 and 904; and cutout region calculating units 605 and 905. I/O interface 13 corresponds to video signal input units 101, 601, and 901. Communication circuit 15 corresponds to main video signal transmitting units 103, 603, and 903; cutout information receivers 104, 607, and 907; and cutout candidate transmitting units 606 and 906.

Display device 20 (an example of a display device) includes CPU 21, RAM 22, communication circuit 25, input device 27, and display 28, all of which compose a control circuit connected through a bus with one another. CPU 21 (an example of the second controller) controls processes and signal transmission in each component inside display device 20 based on predetermined programs. RAM 22 stores programs and data required for processing. Communication circuit 25 (an example of the third receiver) is connected with another device such as video recording device 10 to send and receive signals. Input device 27 is a device that accepts input operation of a user, such as a touch panel, keyboard, and mouse. Display 28 (an example of the display unit) is a display device such as a liquid crystal display and organic electroluminescence display.

CPU 21 executes predetermined programs to perform operation and functions of components such as cutout information setting units 203, 705, and 1005; and cutout candidate converting units 704 and 1004. Communication circuit 25 corresponds to video signal receivers 201, 701, and 1001; cutout information transmitting units 204, 706, and 1006; and cutout candidate receivers 703 and 1003. Input device 27 accepts input operation by a user for setting cutout information by cutout information setting units 203, 705, and 1005. Display 28 corresponds to display units 202, 702, and 1002.

Fifth Exemplary Embodiment 5-1 Configuration

Figure 16:
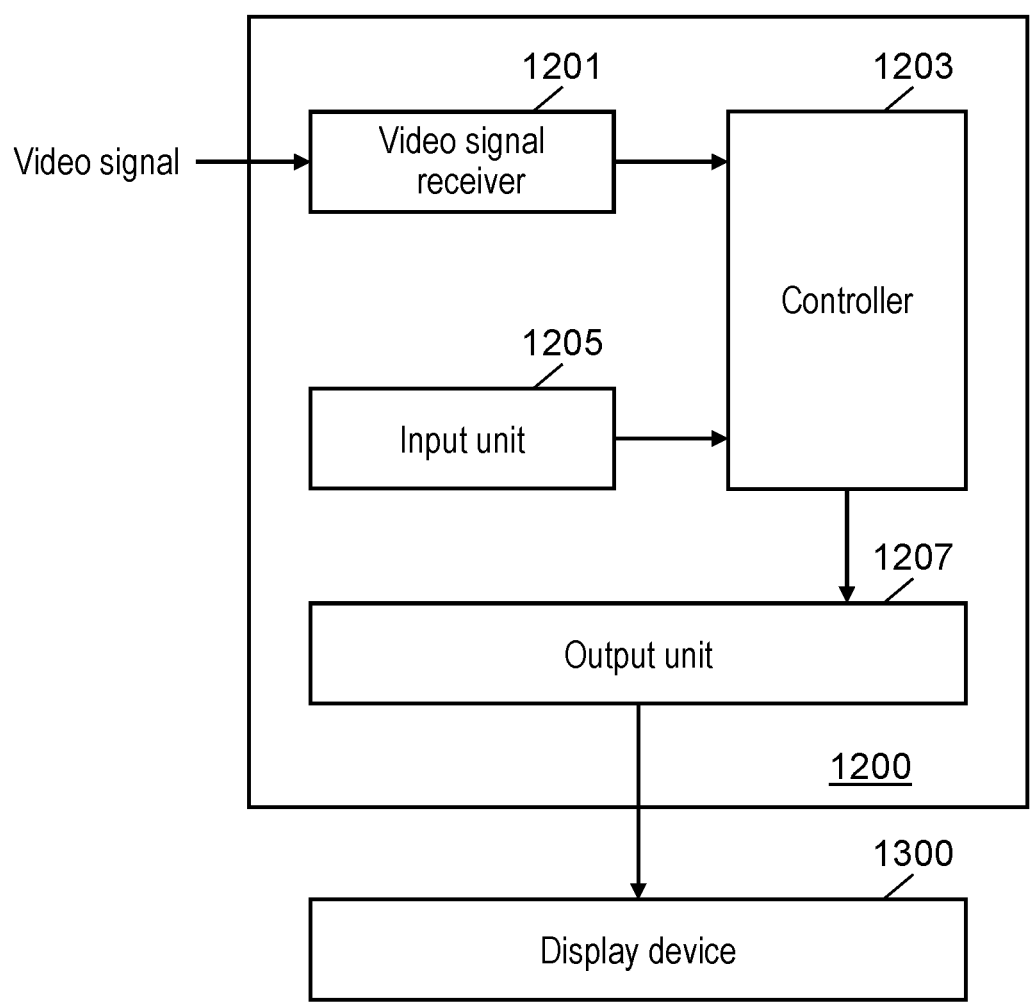
FIG. 16 is a block diagram of a display device according to the fifth exemplary embodiment.

FIG. 16 illustrates the configuration of video output device 1200 according to the fifth embodiment. Video output device 1200 outputs a main video signal recorded by video recording systems 1, 2, and 3 of the first through fourth embodiments; and sub video signals associated to the main video signal, in a displayable manner.

Video output device 1200 (an example of a video output device) is a computer terminal for example. Video output device 1200 is connected to display device 1300 such as a liquid crystal display and organic electroluminescence display. Here, video output device 1200 and display device 1300 may be connected with each other wiredly or wirelessly, or may be of an integral type such as a tablet terminal and laptop PC.

Video output device 1200 includes video signal receiver 1201, controller 1203, input unit 1205, and output unit 1207. Video signal receiver 1201 is composed of an input terminal, a receiver, and other components and accepts video data recorded on another device. Controller 1203 (an example of a controller) includes a control circuit (e.g., a CPU) and memory, and executes processes for video data based on command signals from input unit 1205 and predetermined programs. Input unit 1205 is a keyboard, mouse, and/or touch panel for example, and generates command signals through input operation of a user. Output unit 1207 is composed of an output terminal and a transmitter for example, and outputs video data processed by controller 1203.

5-2 Operation

Figure 17:
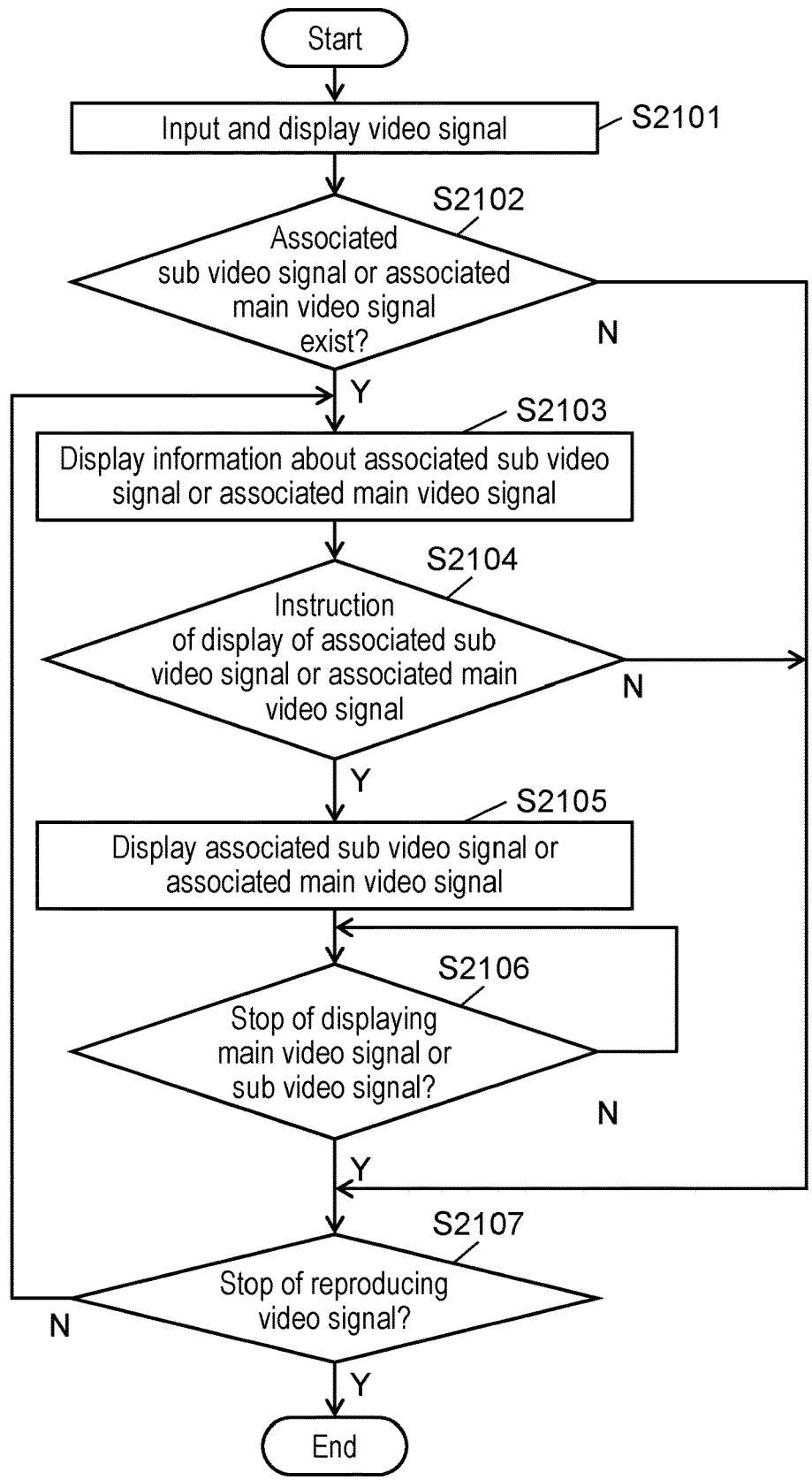
FIG. 17 is a flowchart illustrating operation of a video output device according to the fifth embodiment.

FIG. 17 is a flowchart illustrating operation of video output device 1200 and display device 1300.

When main video data or sub video data recorded on another device is input, the data is displayed on the screen of display device 1300 through output unit 1207 (step S2101). When main video data is input, controller 1203 reads the UMID and determines whether its associated sub video data is present (step S2102). When sub video data is input, controller 1203 reads the UMID and determines its associated main video data (step S2102).

If associated sub video data or associated main video data is present, controller 1203 reads cutout information of the multiplexed data, and makes display device 1300 display the result through output unit 1207 (step S2104). Here, cutout information at this moment may be displayed as either text information or a cutout region corresponding to the sub video signal, to the main video signal as shown in FIG. 12 for example.

Figure 18:
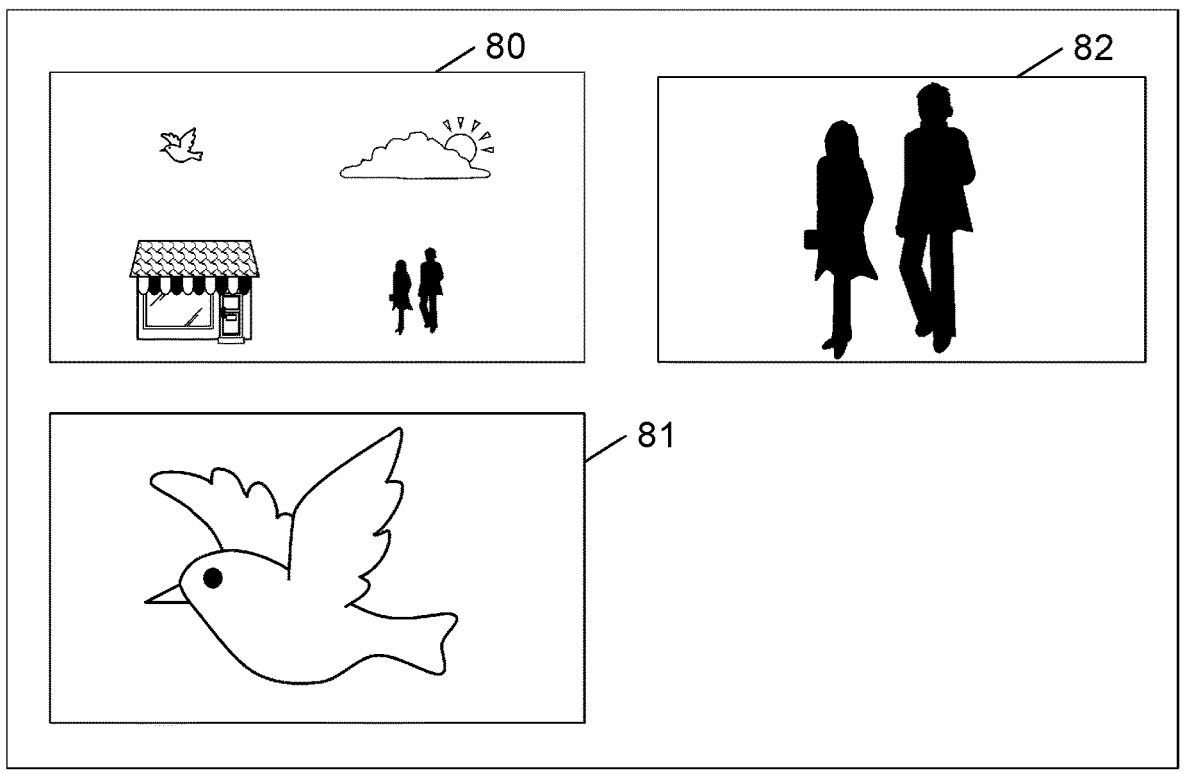
FIG. 18 illustrates an image displayed by the video output device according to the fifth embodiment.

Controller 1203, if receiving a command of displaying associated sub video data or associated main video data through operation of input unit 1205 by a user, acquires the data through video signal receiver 1201 and makes display device 1300 display the data through output unit 1207 (step S2105). At this moment, as shown in FIG. 18, the main video signal or sub video signal first input in step S2101 may be displayed simultaneously with associated sub video signals 81 and 82 or associated main video signal 80 on the screen of display device 1300. Alternatively, these sub and main video signals may be selectively displayed through operation of input unit 1205 by a user. Controller 1203 makes display device 1300 display the associated sub video signal or associated main video signal as long as a command of stopping display is not received (step S2106).

If a command of stopping reproducing of the video signal is received (Yes in step S2107), controller 1203 terminates the process of displaying the video signal.

5-3 Features

In an attempt to reproduce a video signal, the above-described embodiment outputs information about whether a sub video signal or main video signal associated with the video signal is present, in a displayable manner, which allows a user to reproduce a wide variety of video signals with simple operation and to edit video signals more efficiently.

OTHER EXEMPLARY EMBODIMENTS

Hereinbefore, the description is made of the first through fifth embodiments for exemplification of the technologies in the disclosure. However, these technologies are not limited to the embodiments, but are also applicable to embodiments that have undergone change, substitution, addition, and/or omission. Besides, some components described in the first through fifth embodiments can be combined to create a new embodiment.

Hereinafter, other embodiments are exemplified.

In a video recording system according to the first through fourth embodiments, a sub video signal does not need to be generated simultaneously with video imaging. Another method may be followed. That is, the system reads a recorded video file and then a sub video signal is generated from video data of the file.

In the first through third embodiments, the video recording device (an example of the video processing device) includes media (an example of the recorder), but any other configuration may be used. The recorder may be provided separately from the video processing device and be connected with the video processing device. The recorder may be provided remotely to store video files transmitted through a communication line.

In the first through third embodiments, an UMID is presented as an example of subject position information, but other formats may be used for an identifier.

In the first through third embodiments, an encoder that encodes video signals may be provided in the imaging device connected to the video signal input unit.

In the fourth embodiment, video recording device 10 and display device 20 are described as separate computer terminals, but they may be configured as one computer terminal. The CPU and other components may include two or more CPUs.

In a video recording system of the above-described embodiments, all or part of the functions of the video recording device, the display device, and the video output device may be implemented using hardware components such as an ASIC (application specific integrated circuit), a PLD (programmable logic device), and an FPGA (field programmable gate array).

Operation of the video recording system, the video recording device, the display device, and the video output device of the above-described embodiments is implemented as a video processing method as well.

Operation of the video recording system, the display device, and the video output device may be implemented as video signal processing programs as well. The programs may be recorded on computer-readable recording media. Examples of such recording media include a portable media (e.g., flexible disk, magneto-optical disk, ROM (read only memory), CD-ROM) and a storage device (e.g., a hard disk drive) incorporated into a computer system. These video signal processing programs may be read through an electric communication line for execution.

INDUSTRIAL APPLICABILITY

The present disclosure is applicable to a video recording system, concretely to a camera recorder and a digital still camera.

REFERENCE MARKS IN THE DRAWINGS

1, 2, 3 video recording system
10 video recording device
11 CPU
12 RAM
13 I/O interface
15 communication circuit
20 display device
21 CPU
22 RAM
25 communication circuit
27 input device
28 display
30 recorder
50 imaging device
100, 600, 900 video recording device
101, 601, 901 video signal input unit
102, 106, 602, 609, 902, 910, 911 encoder
103, 603, 903 main video signal transmitting unit
104, 607, 907 cutout information receiver
105, 608, 908, 909 video signal cutout unit
107, 610, 912 cutout information addition unit
108, 611, 913 file creation unit
109, 612, 914 UMID creation unit
110, 613, 915 UMID addition unit
111, 614, 916 media
200, 700, 1000 display device
201, 701, 1001 video signal receiver
202, 702, 1002 display unit
203, 705, 1005 cutout information setting unit
204, 706, 1006 cutout information transmitting unit
300 entire UMID
301 universal label inside UMID
302 length of UMID from instance number to end
303 instance number inside UMID
304 material number inside UMID
400 UMID of main video signal without sub video signal
401 UMID of main video signal with sub video signal
402, 403 UMID of sub video signal
500, 501 cutout information
500$a$, 501$a$ cutout candidate information
604, 904 subject tracking unit
605, 905 cutout region calculating unit
606, 906 cutout candidate transmitting unit
703, 1003 cutout candidate receiver
704, 1004 cutout candidate converting unit
800 entire video
801, 802 cutout region
1200 video output device
1201 video signal receiver
1203 controller
1205 input unit
1207 output unit
1300 display device

The invention claimed is:

1. A video processing device connectable with a recorder, the video processing device comprising:
   a first receiver receiving a main video signal that contains a plurality of frames which are consecutive in time sequence and is produced by imaging a plurality of subjects including at least one moving subject;
   a second receiver connected to a display device and receiving, from the display device, subject position information specifying a position of one of the plurality of subjects in the main video signal; and
   a controller generating one or more sub video signals from the main video signal based on the subject position information, each of the one or more sub video signals imaging one of the plurality of subjects,
   wherein the controller
      generates main video data including the main video signal and first association information specifying the one or more sub video signals generated from the main video signal,
      generates one or more sub video data including the one or more sub video signals and second association information specifying the main video signal from which the one or more sub video signals have been generated, and
      makes the recorder store the main video data and the one or more sub video data.

2. The video processing device of claim 1, wherein the controller generates the main video data and the one or more sub video data by multiplexing the subject position information with each of the main video signal and the one or more sub video signals.

3. The video processing device of claim 1,
   wherein the controller
      tracks positions of the plurality of subjects contained in the main video signal, and
      generates subject position candidate information specifying each position of the plurality of subjects in the main video signal, and
   wherein the second receiver receives, from the display device, the subject position information that is selected from the subject position candidate information.

4. The video processing device of claim 1,
   wherein the plurality of subjects includes a first subject and a second subject, and
   wherein the one or more sub video signals include a first sub video signal containing the first subject and a second sub video signal containing the second subject.

5. The video processing device of claim 4, wherein
   the plurality of frames include common frames,
   at least part of the first sub video signal is generated from the common frames, and
   at least part of the second sub video signal is generated from the common frames.

6. The video processing device of claim 4, wherein the first sub video signal and the second sub video signal are generated from different frames of the plurality of frames.

7. The video processing device of claim 4, wherein the one or more sub video data is one sub video data in which the first sub video signal and the second sub video signal are in continuance.

8. The video processing device of claim 1, wherein the first association information and the second association information are represented by UMIDs.

9. A video processing system comprising:
   the video processing device of claim 1; and
   a display device connectable to the video processing device,
   wherein the display device includes
      a third receiver receiving the main video signal from the video processing device;
      a display unit displaying the main video signal; and
      a second controller generating the subject position information specifying the position of the one of the plurality of subjects based on the main video signal displayed on the display unit.

10. The video processing system of claim 9,
    wherein the third receiver further receives subject position candidate information specifying each position of the plurality of subjects from the video processing device, and
    wherein the second controller selects the subject position information from the subject position candidate information.

11. A video processing method comprising the steps of:
    receiving a main video signal that contains a plurality of frames which are consecutive in time sequence and is produced by imaging a plurality of subjects including at least one moving subject;
    receiving, from a display device, subject position information specifying a position of one of the plurality of subjects in the main video signal; and
    generating one or more sub video signals from the main video signal based on the subject position information, each of the one or more sub video signals imaging one of the plurality of subjects,
    generating main video data including the main video signal and first association information specifying the one or more sub video signals generated from the main video signal, generating one or more sub video data including the one or more sub video signals and second association information specifying the main video signal from which the one or more sub video signals have been generated, and
    storing the main video data and the one or more sub video data, in a recorder.

* * * * *